(12) United States Patent
Muehlfeld et al.

(10) Patent No.: US 9,939,292 B2
(45) Date of Patent: Apr. 10, 2018

(54) LINEAR GUIDE WITH COMBINED LOAD AND POSITION MEASUREMENT

(71) Applicant: Robert Bosch GmbH, Stuttgart (DE)

(72) Inventors: Johannes Muehlfeld, Wuerzburg (DE); Guenter Reusing, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/105,630

(22) PCT Filed: Nov. 21, 2014

(86) PCT No.: PCT/EP2014/075247
§ 371 (c)(1),
(2) Date: Jun. 17, 2016

(87) PCT Pub. No.: WO2015/090847
PCT Pub. Date: Jun. 25, 2015

(65) Prior Publication Data
US 2016/0313142 A1  Oct. 27, 2016

(30) Foreign Application Priority Data
Dec. 17, 2013 (DE) .......................... 10 2013 226 201

(51) Int. Cl.
*G01B 7/14* (2006.01)
*G01D 5/20* (2006.01)

(52) U.S. Cl.
CPC .............. *G01D 5/20* (2013.01); *G01D 5/204* (2013.01)

(58) Field of Classification Search
None
See application file for complete search history.

(56) References Cited

U.S. PATENT DOCUMENTS

| | | | | |
|---|---|---|---|---|
| 5,530,210 A | * | 6/1996 | Fukuzaki | G06F 3/046 178/20.01 |
| 6,246,230 B1 | * | 6/2001 | Mednikov | G01D 5/2006 324/207.12 |

(Continued)

FOREIGN PATENT DOCUMENTS

| DE | 10 2007 042 796 A1 | 3/2009 |
|---|---|---|
| EP | 1 502 700 A1 | 2/2005 |

(Continued)

OTHER PUBLICATIONS

International Search Report corresponding to PCT Application No. PCT/EP2014/075247, dated Feb. 19, 2015 (German and English language document) (7 pages).

*Primary Examiner* — Patrick Assouad
*Assistant Examiner* — Demetrius Pretlow
(74) *Attorney, Agent, or Firm* — Maginot, Moore & Beck LLP (57) ABSTRACT

The disclosure relates to a linear guide having a guide rail which extends in a longitudinal direction, wherein a guide carriage is mounted on the guide rail in a linearly movable manner in the longitudinal direction, wherein at least one sensor is fitted to the guide carriage and can be used to measure an elastic position change of the guide carriage with respect to the guide rail, wherein the at least one sensor comprises at least one emitter turn arrangement which is connected to an alternating current source. According to the disclosure, at least one receiver turn arrangement which is different from the emitter turn arrangement and is inductively coupled to the at least one emitter turn arrangement is provided.

11 Claims, 6 Drawing Sheets

(56) References Cited

U.S. PATENT DOCUMENTS

| | | | |
|---|---|---|---|
| 6,604,057 B1 * | 8/2003 | Eden | G01D 3/022 702/104 |
| 2001/0052771 A1 | 12/2001 | Jagiella | |
| 2003/0093907 A1 * | 5/2003 | Schroter | G01D 5/2053 33/1 PT |
| 2009/0140729 A1 * | 6/2009 | Roziere | G01D 5/2291 324/207.17 |
| 2010/0315075 A1 * | 12/2010 | Kamiya | G01B 7/30 324/207.25 |
| 2011/0109304 A1 * | 5/2011 | Suzuki | H02K 24/00 324/207.25 |
| 2012/0223724 A1 * | 9/2012 | Vasiloiu | G01B 3/004 324/654 |
| 2013/0314077 A1 * | 11/2013 | Okada | G01B 7/14 324/207.12 |

FOREIGN PATENT DOCUMENTS

| | | |
|---|---|---|
| EP | 2 037 226 A2 | 3/2009 |
| EP | 2 502 030 | 5/2011 |
| FR | 2 888 319 A1 | 1/2007 |
| JP | 2003209043 A * | 7/2003 |

* cited by examiner

LINEAR GUIDE WITH COMBINED LOAD AND POSITION MEASUREMENT

This application is a 35 U.S.C. § 371 National Stage Application of PCT/EP2014/075247, filed on Nov. 21, 2014, which claims the benefit of priority to Serial No. DE 10 2013 226 201.9, filed on Dec. 17, 2013 in Germany, the disclosures of which are incorporated herein by reference in their entirety.

The disclosure relates to a linear guide, and to a method for the operation thereof.

PRIOR ART

EP 1 502 700 B1 has disclosed a linear guide in the form of a linear rolling bearing. The linear guide comprises a guide rail which extends in a longitudinal direction and on which a guide carriage is mounted so as to be movable in the longitudinal direction. On the guide carriage there are fixedly arranged multiple sensors which can measure the spacing between themselves and the associated running surface. Accordingly, an elastic change in position of the guide carriage relative, to the guide rail, arising as a result of external forces acting on the guide carriage, is measured. The sensors may comprise coils which are connected to an alternating-voltage source. The alternating-current generated in the coils is dependent on the spacing between the coil and said running surface.

DE 10 2007 042 796 A1 has disclosed a linear guide with an incrementally operating position measurement system, the sensor of which operates inductively. Here, the sensor comprises an emitter winding arrangement and a receiver winding arrangement. Alternating currents are fed into the emitter winding arrangement, which currents induce alternating voltages in the receiver winding arrangement, said alternating voltages being dependent on the relative position between guide carriage and guide rail in the longitudinal direction. Here, the guide rail is equipped with a material measure.

EP 2 502 030 B1 has disclosed an absolute position measurement system which likewise uses inductive sensors. Said absolute position measurement system likewise operates using emitter and receiver winding arrangements and using a material measure.

SUMMARY

It is the object of the disclosure to provide a linear guide by means of which elastic changes in position of the guide carriage relative to the guide rail can be measured more accurately. Here, an elastic change in position is to be understood to mean all conceivable changes in position with the exception of a change in position in a longitudinal direction. Since the guide carriage is freely movable in the longitudinal direction, elastic changes in position cannot occur here.

According to one embodiment of the disclosure, said object is achieved in that at least one receiver winding arrangement, which differs from the emitter winding arrangement, is provided, said at least one receiver winding arrangement being inductively coupled to the at least one emitter winding arrangement. Accordingly, it is the intention for the measurement principle basically known from DE 10 2007 042 796 A1 to be used not only for the position determination in a longitudinal direction but additionally for determining an elastic change in position of the guide carriage relative to the guide rail.

The at least one emitter and/or the at least one receiver winding arrangement may be in the form of a planar winding arrangement, which preferably comprises multiple winding layers. A sensor of said type is inexpensive to produce and requires little space, and in particular is very thin.

There may be attached to the guide rail at least one material measure which extends in the longitudinal direction and which has a multiplicity of markings, wherein the at least one sensor is arranged opposite the material measure such that the markings influence the inductive coupling between the at least one emitter and the at least one receiver winding arrangement. The material measure has the effect that very specific alternating voltages are induced in the receiver winding arrangements in a manner dependent on the longitudinal position of the guide carriage. Accordingly, the position of the guide carriage relative to the guide rail in the longitudinal direction can be calculated from the induced alternating voltages.

An evaluation device may be provided which is designed to determine, from the voltages induced in the at least one receiver winding arrangement, both elastic changes in position, and changes in position taking place in the longitudinal direction, of the guide carriage relative to the guide rail. For this purpose, the evaluation device preferably comprises analog-digital converters, which are connected to a processing unit. Here, the proposed device is realized, by way of permanent storage of a computer program in the processing unit.

It is possible for at least one first and at least one second sensor to be provided, which generate mutually phase-offset sinusoidal signals. By means of the first and the second sensors, it is sought primarily for a change in position of the guide carriage relative to the guide rail to be determined with high accuracy. Here, only the ratio of the amplitudes of the first and of the second sensor are of importance. It is preferably the case that, from the phase-offset sinusoidal signals, intermediate values are interpolated by way of which it is possible to distinguish between positions whose spacing is smaller than the pitch spacing of the incremental material measure. At the same time, on the basis of the signals of the first and of the second sensor, it is possible for the spacing between the first and second sensor respectively and the guide rail to be determined with high accuracy. Furthermore, it is also possible for a tilt angle of the guide carriage relative to the guide rail to be determined.

A third sensor may be provided which generates an absolute signal, wherein the third sensor is assigned an absolute material measure, the pitch spacing of which is equal to or greater than the pitch spacing of an incremental material measure, which is assigned to the first and the second sensor. By way of the third sensor, it is the intention to determine the absolute position of the guide carriage relative to the guide rail in the longitudinal direction, without the guide carriage having to be moved for this purpose. At the same time, by way of the third sensor, an elastic change in position in the direction of a vertical axis can be determined. Here, the vertical axis is oriented perpendicular to the longitudinal direction and perpendicular to the transverse direction.

The guide carriage may comprise a temperature sensor. In this way, it is sought to allow for the temperature-dependent ohmic resistance of the emitter and of the receiver winding arrangement in the signal evaluation, such that the measurement accuracy is increased.

The at least one sensor may operate differentially transversely with respect to the longitudinal direction, preferably in the direction of the vertical axis. This relates in particular to the third sensor, by way of which an elastic change in position in the direction of the vertical axis can be determined.

From the voltages induced in the at least one receiver winding arrangement, both elastic changes in position, and changes in position taking place in the longitudinal direction, of the guide carriage relative to the guide rail can be determined. One and the same receiver winding arrangement is thus used to simultaneously determine different changes in position. In this way, the production outlay for the linear guide is reduced.

An amplitude and/or an offset of the voltages induced in the at least one receiver winding arrangement can be determined, wherein an elastic change in position of the guide carriage relative to the guide rail is determined from the change in the amplitude and/or in the offset. The stated signal parameters have proven to be particularly suitable for determining the desired changes in position. The signals induced in the receiver winding arrangements have a sinusoidal-like profile. Here, the offset is the mean value of said signal. This should ideally be zero, wherein it differs from zero under real conditions.

The force acting on the guide carriage can be determined, preferably calculated, from the determined elastic change in position and from a determined, preferably calculated or measured elasticity of the linear guide. The force acting on the linear guide is the variable of greatest interest to the user of the linear guide. With the proposed method, it can be determined particularly easily.

The remaining service life of the linear guide can be determined, preferably calculated, on the basis of the variation of the determined force with respect to time. The predicted remaining service life is likewise a variable of interest to the user of the linear guide. This can be determined particularly easily by way of the proposed method.

A change in the angular position of the guide carriage relative to the guide rail can be determined from an amplitude difference or a phase difference of the signals of the first and of the second sensor. Tests carried out by the applicant have surprisingly shown that said amplitude or phase difference is influenced by said angular position. With the proposed method, it is thus possible for said angular position to be determined particularly easily.

The temperature of the at least one sensor can be measured, wherein the influence of the temperature on the signal of the at least one sensor is removed on the basis of the measured temperature. The temperature of the at least one sensor has a considerable influence on the signals of the sensor, because the ohmic resistance of the coils that are preferably used is dependent on the temperature. By way of the proposed temperature compensation, the accuracy of the position determination is considerably improved. The measurement of the temperature is preferably performed using the temperature sensor proposed above.

Environmental and/or state influences which are not forces acting on the guide carriage can be estimated from the voltages, induced in the at least one receiver winding arrangement, of the at least one sensor. The environmental influences may for example be the ambient temperature, the media surrounding the linear guide, for example cooling lubricant, or the fouling of the linear guide. The state influences may for example be the temperature of the sensor, if this is not measured by way of a separate temperature sensor.

BRIEF DESCRIPTION OF THE DRAWINGS

The disclosure will be discussed in more detail below on the basis of the appended drawings, in which.

DETAILED DESCRIPTION

Figure 1:
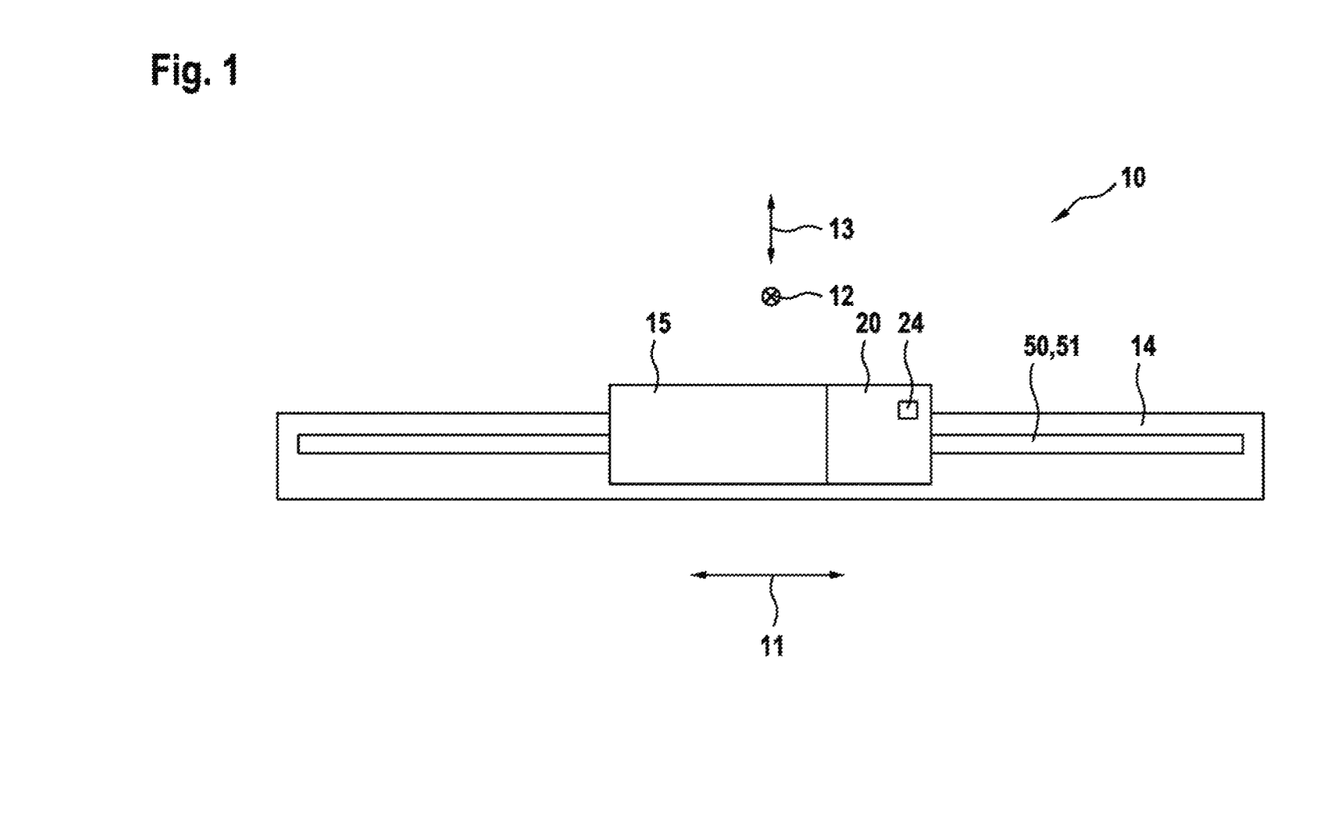
FIG. 1 shows a side view of a linear guide according to the disclosure.

FIG. 1 shows a side view of a linear guide 10 according to the disclosure. The linear guide 10 comprises a guide rail 14 which extends with a constant cross-sectional shape in a longitudinal direction 11. The guide carriage 15 is mounted on the guide rail 14 so as to be movable in the longitudinal direction 11, preferably by way of multiple endlessly encircling rows of rolling bodies. Either the guide carriage 15 or the guide rail 14 is of U-shaped form in cross section, wherein the direction of extent of the corresponding U limb defines a vertical axis 13 oriented perpendicular to the longitudinal direction 11. The transverse axis 12 is oriented perpendicular to the longitudinal direction 11 and perpendicular to the vertical axis 13.

There is attached to the guide rail 14 an incremental and/or an absolute material measure 50; 51, which extend along the entire guide rail. Said material measures may be situated on the same side or on different sides of the guide rail 14.

To one longitudinal end of the guide carriage 15 there is fastened a sensor assembly 20 in which the first, the second and the third sensor, the alternating-current source and the evaluation device are accommodated. Said sensors are in this case arranged, with a small spacing, directly over the associated material measure 50; 51. Furthermore, the sensor assembly is equipped with a temperature sensor 24 which is preferably arranged such that it measures the temperature of said sensors as accurately as possible.

Figure 2:
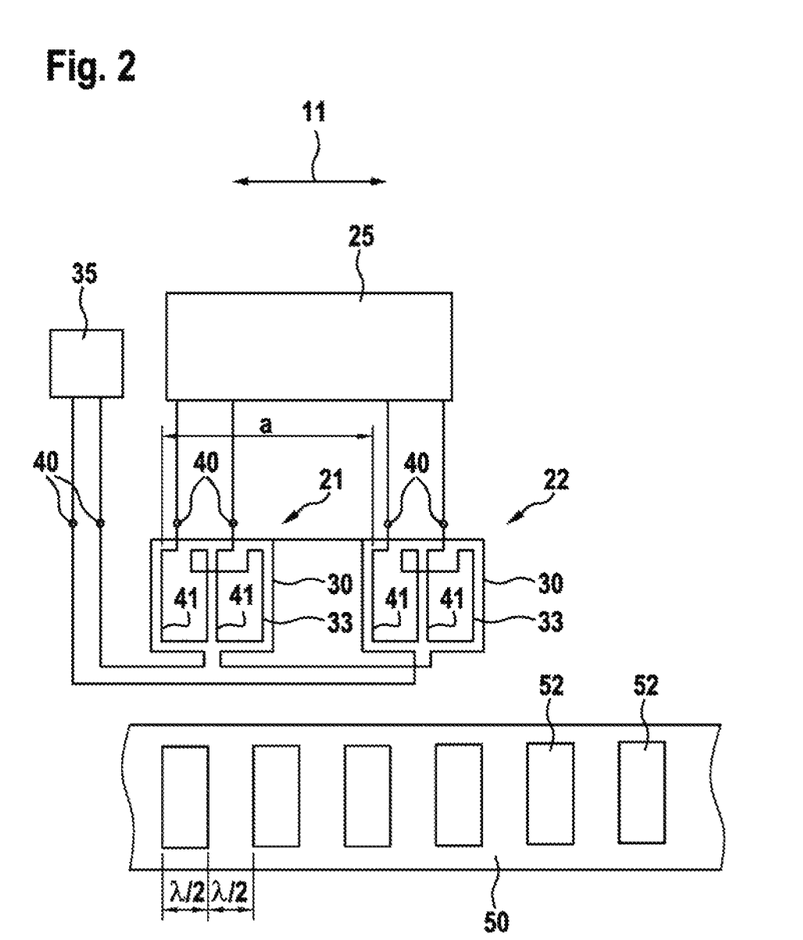
FIG. 2 shows a highly schematic illustration of the first and of the second sensor with the associated incremental material measure.

FIG. 2 shows a highly schematic illustration of the first and of the second sensor 21; 22 with the associated incremental material measure 50. For the sake of clarity, the first and the second sensor 21; 22 are illustrated adjacent to the incremental material measure 50, wherein they are in fact arranged centrally above the latter. The dimensions of the parts shown are illustrated to scale. In the case of the incremental emitter winding arrangement 30 and the incremental receiver winding arrangement 33, always only in each case one single winding turn is illustrated, wherein a multiplicity of winding turns is in fact provided.

The incremental material measure 50 is a thin sheet-metal strip composed of magnetizable steel. Said sheet-metal strip has been provided with a multiplicity of markings 52 which are arranged periodically along the longitudinal direction 11. Each individual marking 50 is composed of a rectangular aperture in the sheet-metal strip, the width of which aperture is equal to half of the pitch spacing λ. The spacing between the apertures thus likewise amounts to λ/2.

The first and the second sensor 21, 22 are of identical form. The major difference consists in the relative position with respect to the markings 50 in the longitudinal direction. The spacing a thereof preferably amounts to a=k×λ+λ/4, wherein k is an arbitrary whole number and is preferably one. Consequently, the second sensor generates a signal which is phase-offset with respect to the signal of the first sensor by 90°.

The first and the second sensor 21, 22 each comprise an incremental emitter winding arrangement 30, which may be composed of coils connected in series or in parallel or of a meandering winding arrangement with the same action, as presented in DE 10 2009 042 940 A1. The incremental emitter winding arrangement 30 is connected by way of terminals 40, which are for example in the form of electrical plug connections, to an alternating-current source 35, which preferably comprises a digital-analog converter and an analog amplifier. The alternating-current source 35 generates a sinusoidal alternating current, the frequency of which is for example 100 kHz.

The incremental receiver winding arrangements 33 are arranged in the free area within the incremental emitter winding arrangement 30. Said incremental receiver winding arrangements each comprise two individual coils 41, which are connected in series with opposite winding directions. It is achieved in this way that the corresponding signals have no offset or only a small offset. Since the individual coils 41 are arranged adjacent to one another with respect to the longitudinal direction 11, this is also referred to as a longitudinally differential coil arrangement. The incremental receiver winding arrangement 33 is connected by way of terminals 40 to the evaluation device 25, wherein the terminals 40 are preferably formed by electrical plug connections.

The evaluation device 25 preferably comprises at least one analog-digital converter and a processing unit. Purely analog signal evaluation may however also be performed.

Figure 3:
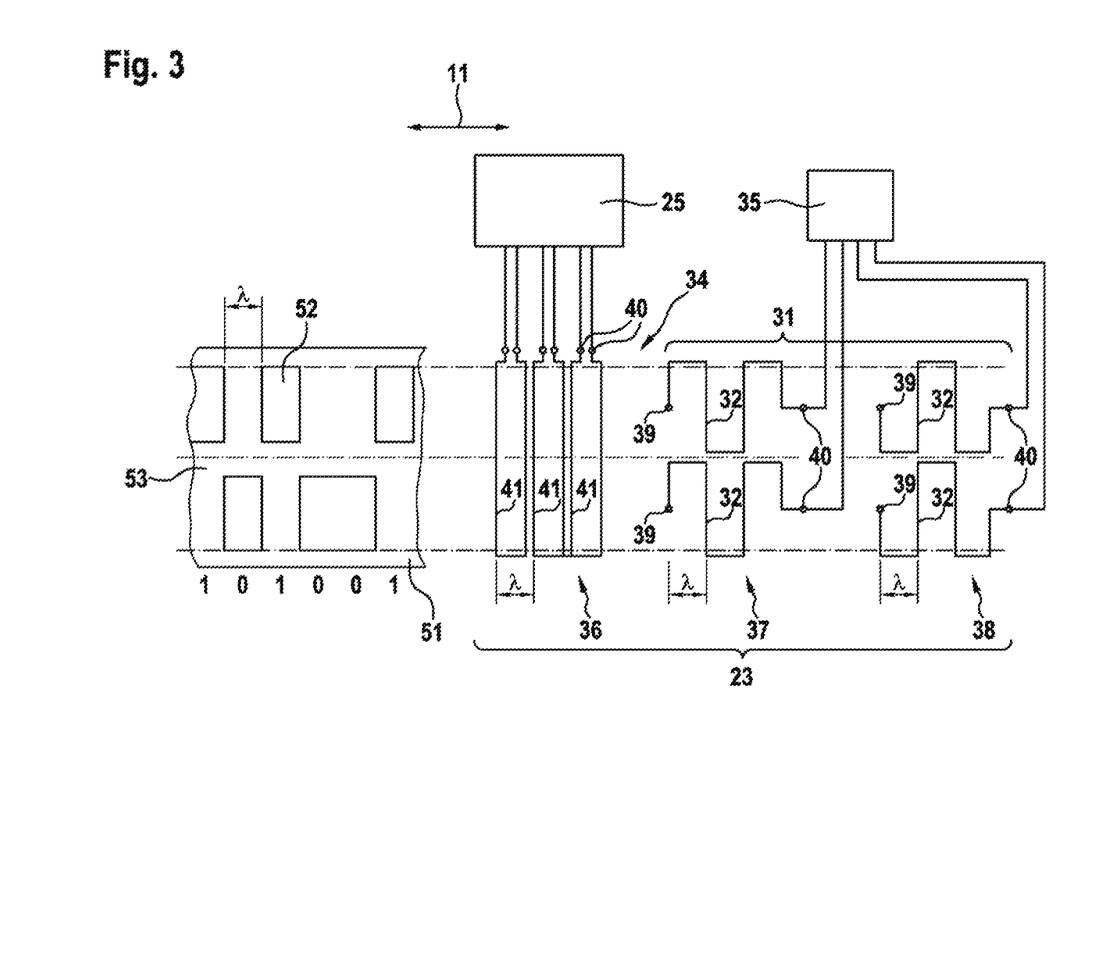
FIG. 3 shows a highly schematic illustration of the third sensor with the associated absolute material measure.

FIG. 3 shows a highly schematic illustration of the third sensor 23 with the associated absolute material measure 51. For the sake of clarity, the various winding layers 36, 37, 38 are arranged adjacent to one another, wherein they are in fact arranged one above the other. Here, they are separated from one another by electrical insulation layers. The through connections 39 of the second and of the third winding layer 37, 38 lie exactly one above the other, wherein they are electrically connected to one another. The individual coils 41 of the first winding layer 36 are arranged in each case within a free area bordered by the absolute emitter winding arrangement 31. The dimensions of the parts shown are illustrated to scale. In the case of the absolute emitter winding arrangement 31 and the absolute receiver winding arrangement 34, it is always the case that only in each case a single winding turn is illustrated, wherein a multiplicity of winding turns is in fact provided.

The incremental material measure 50 is a thin sheet-metal strip composed of magnetizable steel. Said sheet-metal strip has been equipped with a multiplicity of markings 52, which are arranged in a random distribution along the longitudinal direction 11. Each individual marking 50 is composed of a rectangular aperture in the sheet-metal strip, the width of which aperture is equal to the pitch spacing A. Here, it is to be noted that the pitch spacing of the incremental material measure 50 is equal to the pitch spacing of the absolute material measure 51, wherein the former pitch spacing may also be smaller than the latter pitch spacing. In the transverse center of the absolute material measure 51, there is provided a longitudinal web 53 which is continuous in the longitudinal direction 11 and which is free from markings 52. If an aperture is present above the longitudinal web 53, no aperture is present below the longitudinal web 53, and vice versa. The regions above and below the longitudinal web 53 are thus of complementary form to one another.

The alternating-current source 35 feeds in each case a transmitter alternating current, with a frequency of for example 100 kHz, into the absolute emitter winding arrangement 31. This gives rise to a multiplicity of effective circuit currents, wherein directly adjacent circuit currents have an opposite circuit direction. Here, an individual coil 41 of the absolute receiver winding arrangement 33 is assigned in each case two effective circuit currents with opposite circuit direction. These induce in each case an alternating voltage in said individual coil 40. If an absolute material measure 51 without apertures were provided, said alternating voltages would be equal in magnitude but of opposite sign, so as to exactly cancel one another out.

This effect is referred to as compensation. If this were dispensed with, the voltage at the receiver coil would fluctuate, in a manner dependent on the presence of a marking 52, by a signal offset which is greater in magnitude than the fluctuations in the signal. This makes the signal evaluation considerably more difficult. The above winding arrangement is also referred to as being differential transversely with respect to the longitudinal direction 11.

At the locations at which apertures are provided in the absolute material measure 51, the induction effect is attenuated, such that the two induced voltages no longer cancel one another out. Then, at the individual coil 41 of the absolute receiver winding arrangement 34, an alternating voltage prevails whose amplitude indicates which side of the longitudinal web 53 the aperture or the marking 52 is arranged on.

It is to be noted that eddy currents are also induced in the absolute material measure 51, which eddy currents exactly counteract the above effect. Since the material measure is composed of rust-resistant steel of low electrical conductivity, said eddy currents are however small.

The individual coils 41 of the absolute receiver winding arrangement 33 are connected via terminals 40 to the evaluation device 25, wherein the terminals 40 are preferably formed by electrical plug connections. The evaluation device 25 preferably comprises at least one analog-digital converter and one processing unit. Purely analog signal evaluation may however also be performed. The incremental and the absolute signal evaluation are preferably performed in a common evaluation device 25.

Figure 4:
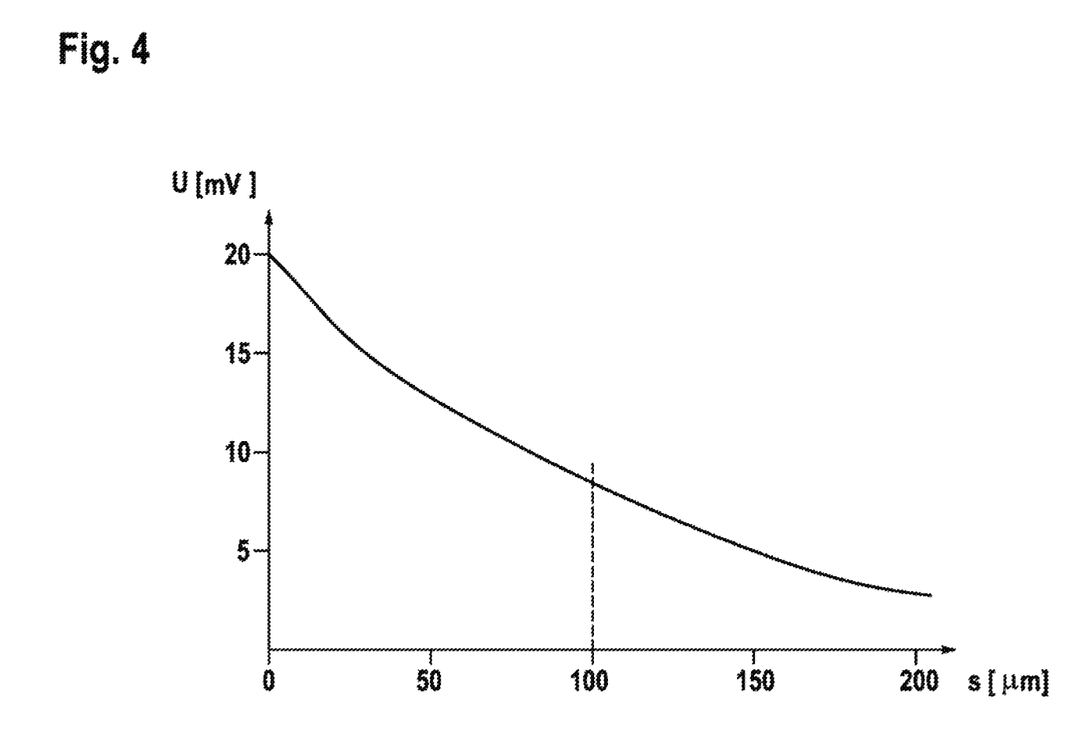
FIG. 4 shows a diagram illustrating the relationship between the signal amplitude measured at the sensors and a change in position.

FIG. 4 shows a diagram illustrating the relationship between the signal amplitudes U measured at the sensors 21; 22; 23 and the spacing s between the guide rail and sensor. The spacing s between the sensor 21; 22; 23 and the associated material measure 50; 51 in the direction of the transverse axis (reference numeral 12 in FIG. 1) is plotted on the horizontal axis. The amplitude U of the electrical alternating voltage induced in the respective receiver winding arrangement 31; 34 is plotted on the vertical axis. If the spacing s is zero, that is to say if the sensor 21, 22, 23 lies against the associated material measure 50; 51, said amplitude assumes a highest possible value. The spacing, denoted by the dashed vertical line, is the spacing which is present when no external force acts on the linear guide. Said spacing is selected approximately such that, there, the signal amplitude U amounts to approximately 50% of the maximum possible value. If said spacing changes owing to external forces acting on the linear guide, the signal changes correspondingly to the illustrated profile, which approximately follows the function $1/(s-s_0)^2$.

Figure 5:
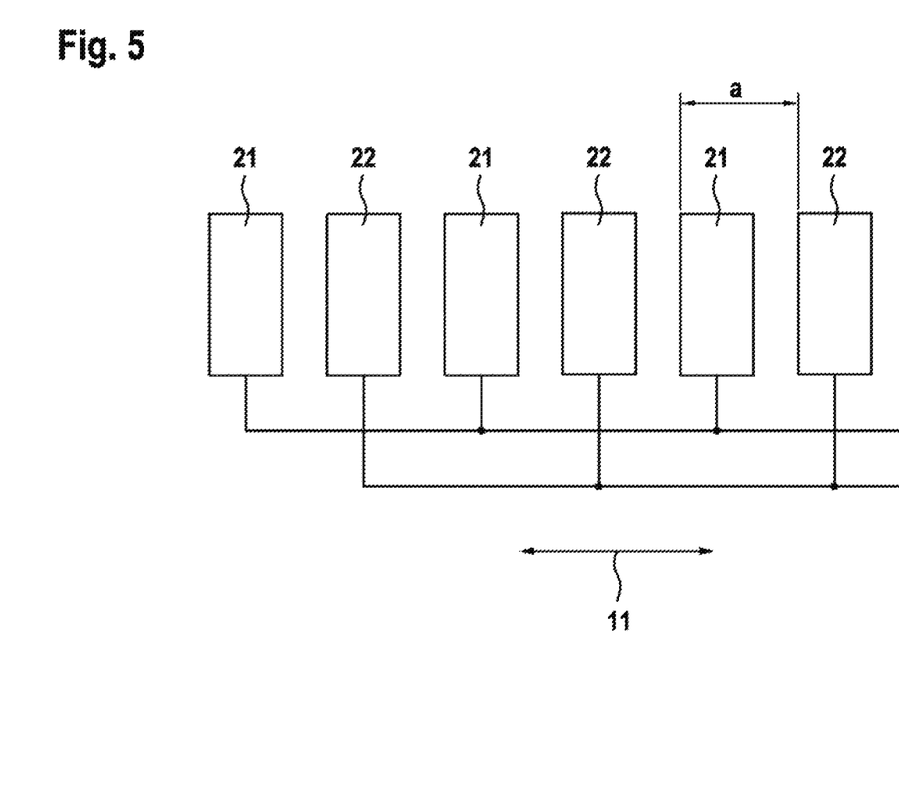
FIG. 5 shows a highly schematic illustration of multiple first and second sensors, which are connected in series.

FIG. 5 shows a highly schematic illustration of multiple first and second sensors 21, 22 which are connected in series. Here, the rectangles are intended to indicate in each case one incremental receiver winding arrangement (numeral 33 in FIG. 2). A second sensor 22 is always arranged between every two adjacent first sensors 21. Here, the number of first and second sensors 21; 22 is selected so as to be equal in order that the same maximum signal amplitudes are present in both cases. The spacing a, already discussed with reference to FIG. 2, between the first and the second sensors 21; 22 in the longitudinal direction 11 is also indicated.

Figure 6:
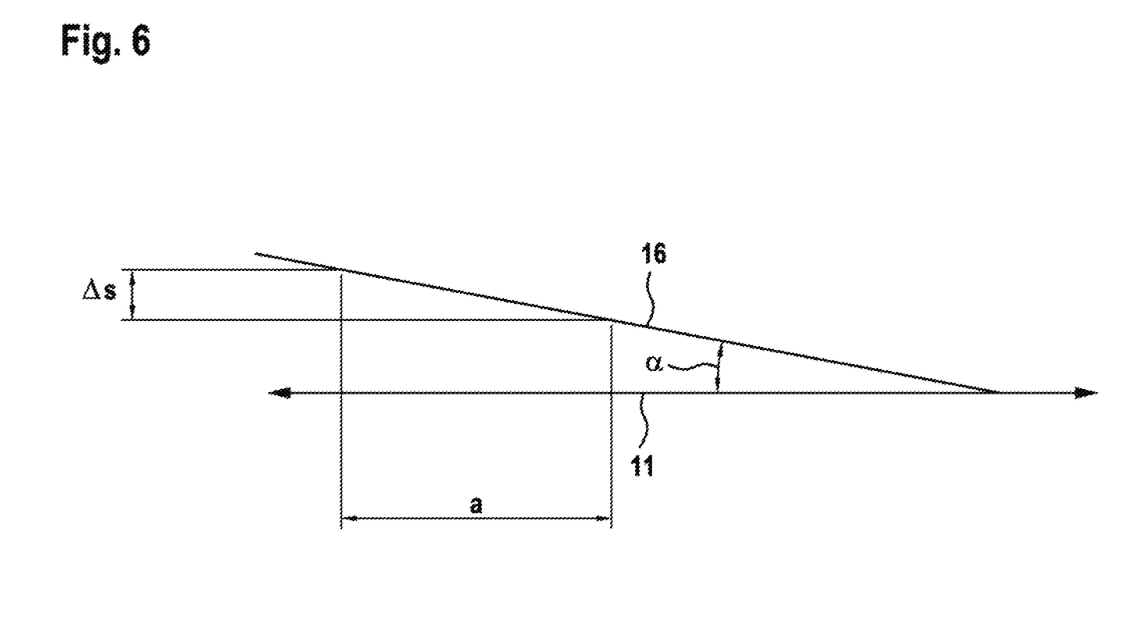
FIG. 6 shows a diagrammatic sketch intended to illustrate the relationship between the amplitude difference between the first and second sensor and the angular position of the guide carriage.

FIG. 6 is a diagrammatic sketch which is intended to illustrate the relationship between the spacing difference $\Delta s$ and the angular position of the guide carriage. The spacing difference $\Delta s$ is in this case formed in that, correspondingly to FIG. 4, from the signals of the first and of the second sensors, the corresponding (mean) spacings to the guide rail are formed, wherein the two spacings are subtracted from one another.

The horizontal line 11 corresponds to the longitudinal direction. The inclined line 16 corresponds to the geometric central line of the guide carriage (numeral 15 in FIG. 1). The lines 11 and 16 enclose the angle $\alpha$. This corresponds to the angle of rotation $\alpha$ of the guide carriage relative to the vertical axis (numeral 13 in FIG. 1). Said angle $\alpha$ is also referred to as yaw angle. Between the spacing a (see FIG. 2) and the spacing difference $\Delta s$, the relationship $\tan 60 = \Delta s/a$ is thus obtained.

LIST OF REFERENCE DESIGNATIONS $\lambda$ Pitch spacing
a Spacing between first and second sensor
$\alpha$ Angle of rotation about the vertical axis
s Spacing between guide rail and sensor
$\Delta s$ Spacing difference
U Signal amplitude
10 Linear guide
11 Longitudinal direction
12 Transverse axis
13 Vertical axis (direction of extent of the U limb)
14 Guide rail
15 Guide carriage
16 Central line of the guide carriage
20 Sensor assembly
21 First sensor
22 Second sensor
23 Third sensor
24 Temperature sensor
25 Evaluation device
30 Incremental emitter winding arrangement
31 Absolute emitter winding arrangement
32 Meandering winding
33 Incremental receiver winding arrangement
34 Absolute receiver winding arrangement
35 Alternating-current source
36 First winding layer
37 Second winding layer
38 Third winding layer
39 Through connection
40 Terminal
41 Individual coil
50 Incremental material measure
51 Absolute material measure
52 Marking
53 Longitudinal web

The invention claimed is:

1. A linear guide comprising:
   a guide rail which extends in a longitudinal direction;
   a guide carriage mounted on the guide rail and configured to be linearly movable in the longitudinal direction;
   at least one sensor attached to the guide carriage and configured to measure an elastic change in position of the guide carriage relative to the guide rail, the at least one sensor comprising at least one emitter winding arrangement connected to an alternating-current source; and
   at least one receiver winding arrangement, which differs from the at least one emitter winding arrangement, the at least one receiver winding arrangement being inductively coupled to the at least one emitter winding arrangement,
   further comprising:
      at least one incremental material measure attached to the guide rail which extends in the longitudinal direction and which has a multiplicity of markings,
      wherein the at least one sensor is arranged opposite the at least one incremental material measure such that the markings of the at least one incremental material measure influence the inductive coupling between the at least one emitter winding arrangement and the at least one receiver winding arrangement; and
   further comprising:
      an evaluation device configured to determine, from voltages induced in the at least one receiver winding arrangement, both (i) elastic changes in position of the guide carriage relative to the guide rail and (ii) changes in position taking place in the longitudinal direction of the guide carriage relative to the guide rail.

2. The linear guide as claimed in claim 1, wherein at least one of (i) the at least one emitter winding arrangement and (ii) the at least one receiver winding arrangement is in the form of a planar winding arrangement.

3. A linear guide comprising:
   a guide rail which extends in a longitudinal direction;
   a guide carriage mounted on the guide rail and configured to be linearly movable in the longitudinal direction;
   at least one sensor attached to the guide carriage and configured to measure an elastic change in position of the guide carriage relative to the guide rail, the at least one sensor comprising at least one emitter winding arrangement connected to an alternating-current source; and
   at least one receiver winding arrangement, which differs from the at least one emitter winding arrangement, the at least one receiver winding arrangement being inductively coupled to the at least one emitter winding arrangement,
   further comprising:
      at least one first sensor and at least one second sensor, which are configured to generate mutually phase-offset sinusoidal signals; and
   further comprising:
      a third sensor configured to generate an absolute signal, the third sensor being assigned an absolute material measure having a pitch spacing which is at least one of equal to and greater than a pitch spacing of an incremental material measure which is assigned to the first sensor and to the second sensor.

4. The linear guide as claimed in claim 1, wherein the guide carriage comprises a temperature sensor.

5. The linear guide as claimed in claim 1, wherein the at least one sensor is configured to operate differentially transversely with respect to the longitudinal direction.

6. A method for operating a linear guide including (i) a guide rail which extends in a longitudinal direction, (ii) a guide carriage mounted on the guide rail and configured to be linearly movable in the longitudinal direction, (iii) at least one sensor attached to the guide carriage and configured to measure an elastic change in position of the guide carriage relative to the guide rail, the at least one sensor comprising at least one emitter winding arrangement connected to an alternating-current source, and (iv) at least one receiver winding arrangement, which differs from the at least one emitter winding arrangement, the at least one receiver winding arrangement being inductively coupled to the at least one emitter winding arrangement, the method comprising:

simultaneously measuring, using the at least one sensor, (i) a position of the guide carriage relative to the guide rail in the longitudinal direction and (ii) a position of the guide carriage relative to the guide rail at least one of in the transverse direction and with respect to an axis of rotation;

determining, from voltages induced in the at least one receiver winding arrangement, both (i) elastic changes in position of the guide carriage relative to the guide rail and (ii) changes in position taking place in the longitudinal direction of the guide carriage relative to the guide rail;

determining at least one of an amplitude and an offset of the voltages induced in the at least one receiver winding arrangement; and     determining an elastic change in position of the guide carriage relative to the guide rail from a change in the at least one of the amplitude and the offset; and     calculating a force acting on the guide carriage from the determined elastic change in position and from one of a calculated elasticity of the linear guide and a measured elasticity of the linear guide.

7. The method as claimed in claim 6, further comprising:
calculating a remaining service life of the linear guide based on a variation of the determined force with respect to time.

8. The method as claimed in claim 6, further comprising:
determining a change in the angular position of the guide carriage relative to the guide rail from at least one of an amplitude difference and a phase difference of signals of the first sensor and the second sensor.

9. The method as claimed in claim 6, further comprising:
measuring a temperature of the at least one sensor; and
removing an influence of temperature on a signal of the at least one sensor based on the measured temperature.

10. The method as claimed in claim 6,
further comprising:
    estimating at least one of environmental and state influences which are not forces acting on the guide carriage from voltages induced in the at least one receiver winding arrangement, of the at least one sensor.

11. The linear guide as claimed in claim 2, wherein the planar winding arrangement comprises multiple winding layers.

\* \* \* \* \*